United States Patent
Jayaraman et al.

(12) United States Patent (10) Patent No.: US 10,915,455 B2
(45) Date of Patent: Feb. 9, 2021

(54) CACHE WARMING: AGILITY FOR A STATEFUL SERVICE

(71) Applicant: Netflix, Inc., Los Gatos, CA (US)

(72) Inventors: Deva Jayaraman, Fremont, CA (US); Shashi Madappa, Campell, CA (US); Sridhar Enugula, Fremont, CA (US); Ioannis Papapanagiotou, San Jose, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 16/561,668

(22) Filed: Sep. 5, 2019

(65) Prior Publication Data

US 2020/0174940 A1 Jun. 4, 2020

Related U.S. Application Data

(60) Provisional application No. 62/775,217, filed on Dec. 4, 2018.

(51) Int. Cl.
*G06F 12/0895* (2016.01)
*G06F 12/0891* (2016.01)
(Continued)

(52) U.S. Cl.
CPC .......... *G06F 12/0895* (2013.01); *G06F 3/067* (2013.01); *G06F 3/0647* (2013.01); *G06F 9/3891* (2013.01); *G06F 12/0837* (2013.01); *G06F 12/0891* (2013.01); *G06F 3/0607* (2013.01)

(58) Field of Classification Search
None
See application file for complete search history.

(56) References Cited

U.S. PATENT DOCUMENTS

2015/0058289 A1* 2/2015 Do .................. G06F 16/2386
707/613
2015/0066843 A1 3/2015 Oliver et al.
(Continued)

FOREIGN PATENT DOCUMENTS

WO 2014/082052 A2 5/2014

OTHER PUBLICATIONS

Nishtala et al. (Scaling Memcache at Facebook) NSDI '13, pp. 385-398 (Year: 2013).*

(Continued)

*Primary Examiner* — Kaushikkumar M Patel
(74) *Attorney, Agent, or Firm* — FisherBroyles, LLP (57) ABSTRACT

The disclosed computer-implemented method includes receiving an indication that cache data is to be copied from an originating cluster having a specified number of replica nodes to a destination cluster having an arbitrary number of replica nodes. The method further includes copying the cache data to a cache dump and creating a log that identifies where the cache data is stored in the cache dump. The method further includes copying the cache data from the cache dump to the replica nodes of the destination cluster. The copying includes writing the copied data in a distributed manner, such that at least a portion of the copied data is distributed over each of the replica nodes in the destination cluster. Various other methods, systems, and computer-readable media are also disclosed.

20 Claims, 4 Drawing Sheets

(51) Int. Cl.
*G06F 3/06* (2006.01)
*G06F 9/38* (2018.01)
*G06F 12/0837* (2016.01)

(56) References Cited

U.S. PATENT DOCUMENTS

| | | | |
|---|---|---|---|
| 2015/0066850 A1* | 3/2015 | Oliver | G06F 11/2097 707/620 |
| 2015/0189013 A1* | 7/2015 | Drobychev | G06F 13/10 709/202 |
| 2016/0323377 A1 | 11/2016 | Einkauf et al. | |
| 2018/0278579 A1* | 9/2018 | Sananes | G06F 16/178 |
| 2018/0373456 A1* | 12/2018 | De Schrijver | G06F 3/061 |
| 2019/0026290 A1* | 1/2019 | Huang | G06F 3/067 |
| 2020/0034063 A1* | 1/2020 | Somasundaram | G06F 3/0647 |

OTHER PUBLICATIONS

International Search Report and Written Opinion received for PCT Application Serial No. PCT/US2019/062982 dated Feb. 12, 2020, 11 pages.
Coles et al., "Rapid Node Reallocation Between Virtual Clusters for Data Intensive Utility Computing", IEEE International Conference on Cluster Computing, Sep. 1, 2006, 10 pages.

* cited by examiner

CACHE WARMING: AGILITY FOR A STATEFUL SERVICE

CROSS REFERENCE TO RELATED APPLICATION

This application claims the benefit of U.S. Provisional Application No. 62/775,217, filed Dec. 4, 2018, the disclosure of which is incorporated, in its entirety, by this reference.

BACKGROUND

Current data distribution systems cache objects to save the time that would normally be needed to compute the data that is to be presented to a client machine. For example, a data distribution system may provide video streaming services. The data distribution system may precompute audio and video data representing video segments or interactive user interface elements that are likely to be viewed by end users. This computing, if performed in real time, may take many tens of seconds or even minutes to complete. Such a delay would be unacceptable to a user.

These data distribution systems typically include multiple clusters of replica nodes. Each replica node stores precomputed cache data that is to be provided to the requesting clients. In some cases, replica nodes may fail, or providers of the data cache may want to scale up or scale down the number of replica nodes in the system. Such scaling typically occurs by creating a new cluster with new nodes and then copying the data from the old cluster to the new cluster. The new clusters, however, demand full new sets of nodes that are separate from the hardware of the old cluster. This effectively requires double the number of nodes to transition to a larger cluster. This results in a large amount of overhead and makes scaling such data distribution systems burdensome and resource-intensive.

SUMMARY

As will be described in greater detail below, the present disclosure describes a method and system for transferring cache data to a destination cluster of an arbitrary size. In one example, a computer-implemented method for transferring data in this manner includes receiving an indication that cache data is to be copied from an originating cluster having a specified number of replica nodes to a destination cluster having an arbitrary number of replica nodes. The method further includes copying the cache data to a cache dump and creating a log that identifies where the cache data is stored in the cache dump. The method also includes copying the cache data from the cache dump to the replica nodes of the destination cluster. The copying includes writing the copied data in a distributed manner, so that at least some of the copied data is distributed over each of the replica nodes in the destination cluster.

In some examples, the cache data is copied from the cache dump to the replica nodes of the destination cluster while the destination cluster is fulfilling client requests. In some examples, replica nodes are dynamically added to or removed from the destination cluster. In some examples, a cache warmer controller tracks the added or removed nodes in the destination cluster. In some examples, the cache warmer controller indicates where to copy the cache data when the nodes are added or removed from the destination cluster.

In some examples, the cache data is copied to the cache dump in configurable size data chunks. In some examples, the configurable-size data chunks are copied to the cache dump as each data chunk becomes available. In some examples, the configurable-size data chunks are copied from the cache dump to the destination cluster as each data chunk becomes available. In some examples, piecewise copying of the configurable-size data chunks from the cache dump to the destination cluster allows the destination cluster to be populated without waiting for an entire replica to be copied to the cache dump. In some examples, each cache replica node includes multiple key-chunks, allowing the cache data to be copied to the cache dump in parallel. In some examples, the destination cluster includes at least one replica node from the originating cluster.

In addition, a system for transferring data includes at least one physical processor and physical memory including computer-executable instructions that, when executed by the physical processor, cause the physical processor to: receive an indication that cache data is to be copied from an originating cluster having a specified number of replica nodes to a destination cluster having an arbitrary number of replica nodes, copy the cache data to a cache dump, create a log that identifies where the cache data are stored in the cache dump, and copy the cache data from the cache dump to the replica nodes of the destination cluster. The copying includes writing the copied data in a distributed manner, so that at least a portion of the copied data is distributed over each of the replica nodes in the destination cluster.

In some examples, the originating cluster is scalable to a new destination cluster at a plurality of different ratios of replica nodes from the originating cluster to the new destination cluster. In some examples, copying the cache data from the cache dump to the replica nodes of the destination cluster occurs asynchronously from the copying of the cache data to the cache dump. In some examples, the asynchronous cache data copies are scheduled for a time when the destination cluster replica nodes are below a specified threshold level of use.

In some examples, at least one replica node of the originating cluster sends a message when at least a portion of the cache data has been copied to the cache dump. In some examples, the message triggers a cache warmer controller to begin copying the cache data from the cache dump to the replica nodes of the destination cluster. In some examples, the cache data is copied from the cache dump to the replica nodes of the destination cluster based on current detected usage or predicted usage of the destination cluster. In some examples, the cache data copied from the cache dump to the replica nodes of the destination cluster includes snapshot data representing a snapshot of a computing system.

In some examples, the above-described method may be encoded as computer-readable instructions on a computer-readable medium. For example, a non-transitory computer-readable medium includes one or more computer-executable instructions that, when executed by at least one processor of a computing device, cause the computing device to: receive an indication that cache data is to be copied from an originating cluster having a specified number of replica nodes to a destination cluster having an arbitrary number of replica nodes, copy the one or more portions of cache data to a cache dump, create a log that identifies where the cache data is stored in the cache dump, and copy the cache data from the cache dump to the replica nodes of the destination cluster. The copying includes writing the copied data in a distributed manner, so that at least a portion of the copied data is distributed over each of the replica nodes in the destination cluster.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to transferring cache data to a destination cluster of an arbitrary size. In conventional data distribution systems, when additional capacity is to be added to a cluster of replica nodes, an entirely new set of nodes is needed. Each of these replica nodes may be hard drives, solid-state drives (SSDs), or some other form of data storage hardware. When a new cluster is to be created, new physical storage hardware is brought online. The amount of physical hardware has more than two times the capacity of the original.

For example, a large traditional data distribution system may have 500 replica nodes in a cluster with two copies of the client's data. As such, for that client, the data distribution system would run a cluster of 1,000 replica nodes. If the client requested additional capacity and wanted to increase the size of the cluster from 500 to 600 nodes, the system would need to instantiate 1,200 new replica nodes in order to copy the data from the old cluster and have the additional capacity of the new cluster. Maintaining all of the old replica nodes (1,000) and the new 1,200 nodes (as the new 1,200 nodes become fully populated with cache data) may place a heavy burden on the data distribution system. These 2,200 storage devices need to be dedicated to this one client during the data copying and would not be available to service other clients.

In contrast to these traditional systems, the embodiments described herein allow a data distribution system to add capacity without the need for full duplicate set of replica nodes. Thus, in the embodiments herein, if a client in the same scenario as above wanted to move from 500 nodes with two copies of the data (for a total of 1,000 nodes), the data distribution systems described herein could simply add the 200 nodes to the cluster and begin copying the data to the 200 new nodes. This would result in a total of 1,200 nodes used during the data copying, as opposed to the 2,200 nodes needed in traditional data distribution systems. This presents a substantial savings in overhead when scaling a cluster to a different size.

In some cases, systems for transferring cache data to a destination cluster of an arbitrary size receive an indication that cache data is to be copied from an originating cluster having a certain number of replica nodes to a destination cluster having an arbitrary number of replica nodes. The systems copy the cache data to a cache dump and create a log that identifies where the cache data is stored in the cache dump. The systems copy the cache data from the cache dump to the replica nodes of the destination cluster. The copying includes writing the copied data in a distributed manner, so that at least some of the copied data is distributed over each of the replica nodes in the destination cluster.

In some cases, the cache data is copied from the cache dump to the replica nodes of the destination cluster while the destination cluster is fulfilling client requests. The replica nodes are dynamically added to or removed from the destination cluster. In some cases, a cache warmer controller tracks the added or removed nodes in the destination cluster. The cache warmer controller indicates where to copy the cache data when the nodes are added or removed from the destination cluster.

In some cases, the cache data is copied to the cache dump in configurable size data chunks. The configurable-size data chunks are copied to the cache dump as each data chunk becomes available. The configurable-size data chunks are also copied from the cache dump to the destination cluster as each data chunk becomes available. This piecewise copying of the configurable-size data chunks from the cache dump to the destination cluster allows the destination cluster to be populated without waiting for an entire replica to be copied to the cache dump. In some cases, each cache replica node includes multiple key-chunks, allowing the cache data to be copied to the cache dump in parallel. The destination cluster includes at least one replica node from the originating cluster.

The originating cluster is scalable to a new destination cluster at multiple different ratios of replica nodes from the originating cluster to the new destination cluster. Copying the cache data from the cache dump to the replica nodes of the destination cluster occurs asynchronously from the copying of the cache data to the cache dump. The asynchronous cache data copies are scheduled for a time when the destination cluster replica nodes are below a specified threshold level of use.

In some cases, a replica node of the originating cluster sends a message when at least some of the cache data has been copied to the cache dump. The message triggers a cache warmer controller to begin copying the cache data from the cache dump to the replica nodes of the destination cluster. The cache data is copied from the cache dump to the replica nodes of the destination cluster based on current detected usage or predicted usage of the destination cluster. In some cases, the cache data copied from the cache dump to the replica nodes of the destination cluster includes snapshot data representing a snapshot of a computing system. These concepts will be explained in greater detail below with regard to FIGS. 1-8.

Figure 1:
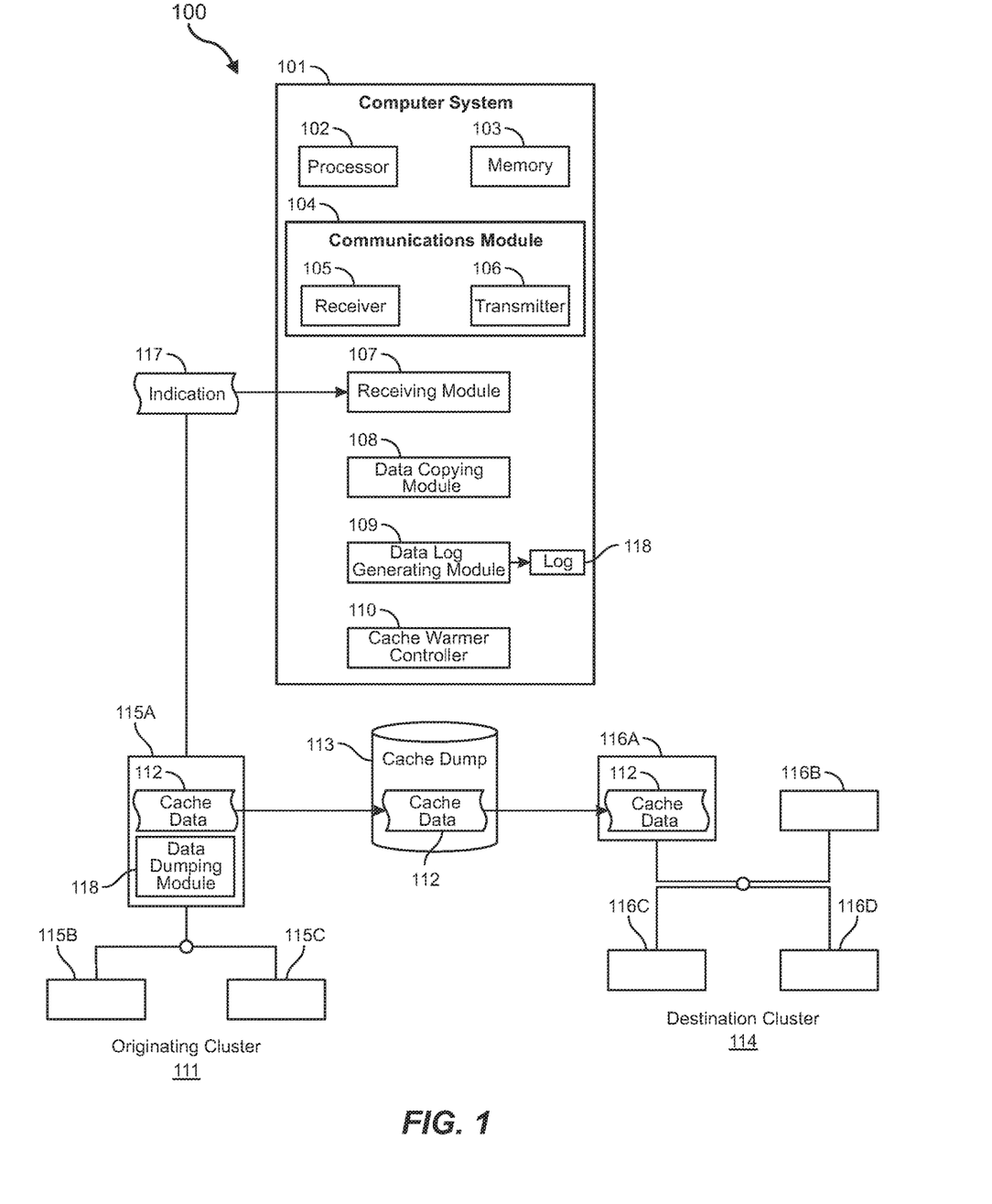
FIG. 1 illustrates a computing architecture in which the embodiments described herein operate.

FIG. 1 illustrates a computing environment 100 that includes a computer system 101. The computer system 101 may be substantially any type of computer system including a local computer system or a distributed (e.g., cloud) computer system. The computer system 101 includes at least one processor 102 and at least some system memory 103. The computer system 101 also includes program modules for performing a variety of different functions. The program modules are hardware-based, software-based, or include a combination of hardware and software. Each program module uses computing hardware and/or software to perform specified functions, including those described herein below.

For example, the communications module 104 communicates with other computer systems. The communications module 104 includes wired or wireless communication means that receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 interacts with databases, mobile computing devices (such as mobile phones or tablets), embedded or other types of computing systems.

The computer system 101 also includes a receiving module 107. The receiving module 107 receives information from other entities or computing systems. For example, in FIG. 1, the receiving module 107 receives an indication 117 from data cluster 111. In some cases, the cluster 111 is an originating cluster that includes data that is to be copied to a destination cluster (e.g., 114). The originating cluster 111 is the source of the cache data that is to be copied to the destination cluster 114. The originating cluster 111 includes different replica nodes including 115A, 115B, and 115C. Although the originating cluster 111 is shown as having three replica nodes, it will be understood that the originating cluster 111 (or the destination cluster 114) may have substantially any number of replica nodes. Some or all of the replica nodes 115A-115C include data dumping modules (e.g., 118). These data dumping modules 118 are configured to copy cache data 112 to the cache dump 113 in chunks. The data dumping modules 118 also send an indication 117 to the computer system 101 indicating that cache data 112 is to be copied to the originating cluster 111 to the destination cluster 114. In some embodiments, another controller, application, or entity may send the indication 117 to the computer system 101 indicating that the data copy process is to begin.

Upon receiving the indication 117, the data copying module 108 of computer system 101 begins to copy cache data 112 from the cache dump 113 to the destination cluster 114, potentially while other cache data is being copied from the originating cluster 111 to the cache dump 113. The cache dump 113 may be any type of data storage hardware including a local or distributed data store such as a cloud data store. The cache dump 113 may be accessible via wired or wireless networks that link the originating cluster 111 and the destination cluster 114. The cache dump 113 thus temporarily stores the cache data 112 while the cache data is being copied to the destination cluster 114. The data log generating module 109 of computer system 101 generates a log file 118 to track where the cache data 112 is being copied to. For example, the log file 118 tracks where the cache data 112 is copied to on the cache dump 113 and/or where the cache data is copied to on the destination cluster 114. The data copying module 108 continues to copy the cache data 112 from the cache dump 113 to the destination cluster 114 until the copying is complete. In some cases, the nodes of the destination cluster 114 are different than the nodes in the originating cluster, and in other cases, at least some of the replica nodes of the destination cluster are the same as the nodes in the originating cluster. This will be described further below with regard to method 200 of FIG. 2.

Figure 2:
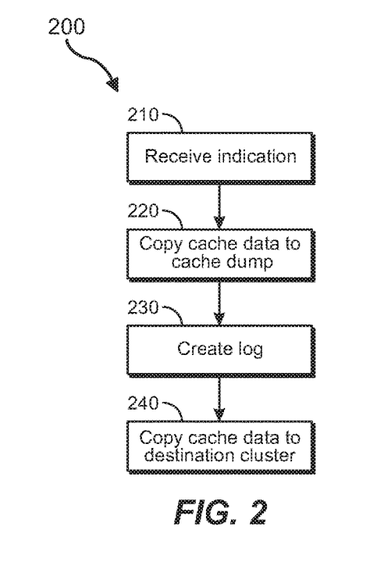
FIG. 2 illustrates a flow diagram of an exemplary method for transferring cache data to a destination cluster with an arbitrary number of replica nodes.

FIG. 2 is a flow diagram of an exemplary computer-implemented method 200 for transferring cache data to a destination cluster of an arbitrary size. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, the computer system 101 receives an indication that cache data is to be copied from an originating cluster having a specified number of replica nodes to a destination cluster having an arbitrary number of replica nodes. For instance, the receiving module 107 of computer system 101 receives an indication 117 from the originating cluster 111 or from some other application or entity. The indication 117 notifies the computer system 101 that cache data is to be copied from one cluster to another. In some cases, the data is copied to the new cluster because the new cluster has a larger capacity. In other cases, the data is copied to the new cluster because the new cluster has a smaller capacity. In some cases, the data is copied to a new node or instance in an existing cluster, for example, if that cluster had a node go down due to hardware failure. Regardless of the reason for copying the cache data, the indication 117 indicates that cache data is to be copied from an originating location to a destination.

At step 220, the method 200 copies the cache data to a cache dump. In one example, the cache warmer controller 110 directs the data dumping module 118 to copy cache data 112 from the originating cluster 111 to the cache dump 113. The cache data 112 may be any type of data including video data, audio data, productivity suite data, backup data, web page data, database blobs, or other types of data. When the cache data 112 is copied to the cache dump 113, the data log generating module 109 generates or updates a log file 118 at step 230 of method 200. The log file 118 identifies where the cache data is stored in the cache dump. The cache dump 113 stores cache data for many different clients and, as such, the log file 118 tracks where the data is stored in the cache dump on a per-client basis.

At step 240 of method 200, the data copying module 108 copies the cache data 112 from the cache dump to the replica nodes of the destination cluster 114 (e.g., nodes 116A-116D). In some examples, the copying includes writing the copied data in a distributed manner, so that at least some of the copied data is distributed over each of the replica nodes in the destination cluster. For instance, as shown in FIG. 3, data from an originating cluster may be spread across some or all of the new nodes in the destination cluster.

Figure 3:
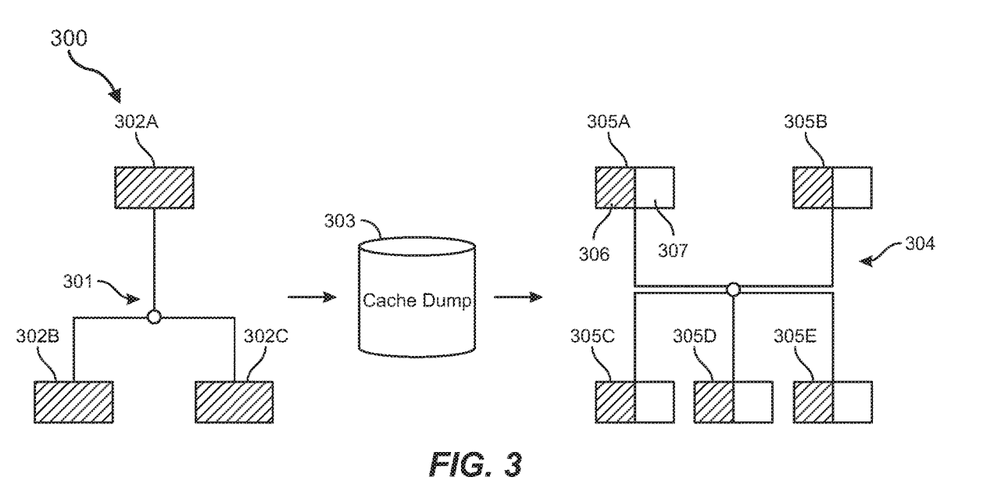
FIG. 3 illustrates an embodiment in which data is distributed over the nodes of a destination cluster.

In the computing environment 300 of FIG. 3, each of the replica nodes of the originating cluster 301 (e.g., nodes 302A-302C) is substantially full of cache data, as indicated by the cross hatching. After at least some of the cache data is copied to the cache dump 303, the cache data is copied to the new destination cluster 304, which includes replica nodes 305A-305E. When the data is copied to the replica nodes 305A-305E, the data is distributed over the five nodes of the destination cluster 304. Assuming the replica nodes in clusters 301 and 304 are equal, the data filling 3/3 replica nodes in the originating cluster 301 is spread onto five replica nodes. As such, the data does not fill each of the new nodes 305A-305E, but takes up approximately 60 percent of the storage space on each node. As such, after the copying is complete, the destination cluster 304 includes all of the data from the originating cluster 301, but also includes additional capacity to store more cache data. In cases where replicas are being warmed with cache data, the originating cluster 301 will continue to service client read/write requests, and the destination cluster 304 will handle only write requests. Whereas in cases where individual nodes are being warmed with cache data, the originating and destination clusters will handle both reads/writes and corresponding clients will perform retries across replicas if a read or write request results in a data miss.

In some embodiments, the cache data is copied a portion at a time from the originating cluster to the cache dump to the destination cluster. For example, in FIG. 1, the cache data 112 of originating cluster 111 may be copied to the cache dump 113 one portion at a time. Thus, much of the data remains on the originating cluster 111 while the copying occurs. As such, in at least some embodiments, the cache data 112 is copied from the originating cluster 111 to the cache dump 113 and from the cache dump to the nodes of the destination cluster 114 while the originating cluster is fulfilling client requests. As more of the cache data is copied over to the destination cluster 114, the log file 118 keeps track of where the cache data 112 is currently located. Once at least some of the cache data 112 has been moved from the cache dump 113 to the destination cluster 114, the destination cluster may begin fulfilling client requests with the data that has been copied over. In such cases, the destination cluster 114 may also continue fulfilling client requests while the data is being copied over from the cache dump.

In at least some embodiments, the cache data 112 is copied asynchronously from the originating cluster 111 to the cache dump 113. The cache data 112 may also be copied asynchronously from the cache dump 113 to the destination cluster 114. Accordingly, the cache data 112 may be transferred at substantially any time and at any rate between nodes. For instance, if the originating cluster 111 is busy fulfilling client requests, data copying to the cache dump 113 slows down to prioritize the client requests. Similarly, if bandwidth between the cache dump 113 and the destination cluster 114 becomes limited due to a hardware fault or for other reasons, or if the destination cluster is handling client requests, the copying of data from the cache dump 113 to the destination cluster 114 is also delayed or slowed down to prioritize the fulfilling of client requests. In some cases, cache data 112 builds up in the cache dump 113 while waiting to be copied to the destination cluster 114. In such cases, the cache data 112 is maintained on the originating cluster 111 until the data has been successfully copied to the destination cluster 114.

Figure 4:
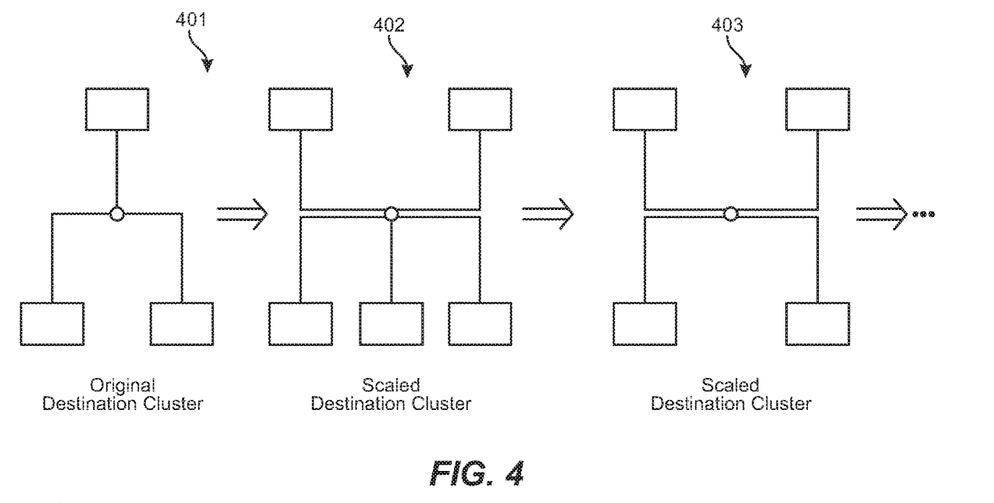
FIG. 4 illustrates an embodiment in which an original destination cluster is scaled to different sizes.

FIG. 4 illustrates an embodiment in which replica nodes are dynamically added to or removed from a destination cluster. For example, at some point in time after the original destination cluster 401 has been created, a client may want to increase the storage capacity of the original destination cluster. As such, the original destination cluster 401 is scaled up from three nodes to five nodes in the scaled destination cluster 402. The number of nodes in the scaled cluster may be chosen arbitrarily. The number of nodes in the new cluster does not need to be 2× the number of nodes in the originating cluster. Rather, the number of nodes in the scaled cluster may be any arbitrary number. In some cases, the scaling occurs dynamically, as described above with reference to method 200 of FIG. 2. Similarly, if at a later point in time, the client decides that the extra storage capacity is no longer needed, the client may request that the destination cluster be downsized. After processing this request, the scaled destination cluster 403 only includes four replica nodes. The destination cluster 403 may be scaled again to include more or fewer nodes and may be increased or reduced dynamically, while continuing to fulfill client requests.

In some embodiments, a cache warmer controller (e.g., 110 of FIG. 1) is instantiated on computer system 101 to track the replica nodes that have been added or removed from the destination cluster. As used herein, the term "cache warmer controller" refers to a hardware controller, firmware controller, software controller, or software application that directs the copying of data from one location to another in an attempt to prepare or "warm" the new location to provide the data. Thus, for example, when data is copied from the originating cluster 111 to the cache dump 113 and then to the destination cluster 114 in FIG. 1, the cache warmer controller 110 controls any or all aspects of these data transfers. For example, in some cases, the cache warmer controller 110 controls the rate at which cache data 112 is copied from the originating cluster 111 to the cache dump, and/or the rate at which the cache data is copied from the cache dump 113 to the destination cluster 114. In some cases, the cache warmer controller 110 controls when the data transfers are started, stopped, or put on hold. The cache warmer controller 110 controls, or is at least aware of, which nodes from the originating cluster 111 are part of the new cluster 114, and which nodes have been added to or removed from the destination cluster 114.

In some embodiments, the cache warmer controller 110 indicates where to copy the cache data 112 when the nodes are added or removed from the destination cluster 114. For example, if some portion of cache data 112 has been copied to the cache dump 113 and that data has not yet been copied to the destination cluster 114, the cache warmer controller 110 tracks which nodes have been added to the destination cluster 114 or have been removed therefrom. As such, the cache warmer controller 110 may direct how the cache data 112 stored in the cache dump 113 is copied to the nodes of the destination cluster 114. In some cases, the cache warmer controller 110 consults the log file 118 to determine where to copy the cache data.

Figure 5:
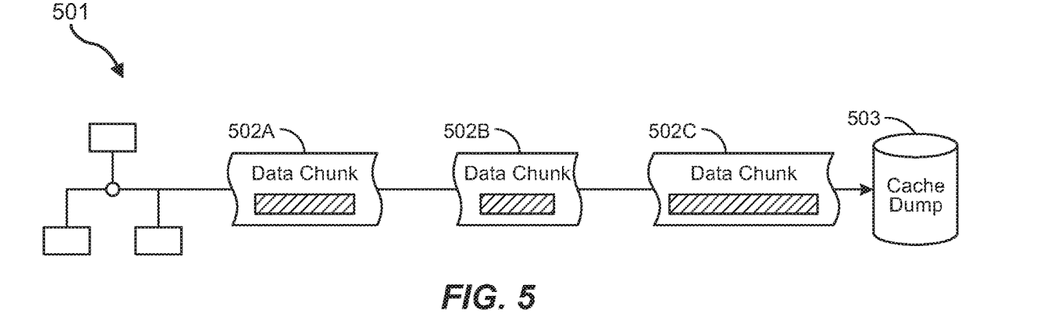
FIG. 5 illustrates an embodiment in which data chunks of varying sizes are transmitted between an originating cluster and a cache dump.

The cache warmer controller 110 may also indicate how the cache data is to be copied. For example, the data copying module 108 of FIG. 1 may copy the cache data 112 from the cache dump to the destination cluster 114 in variable or configurable size data chunks. For example, as shown in FIG. 5, an originating cluster 501 sends different sized data chunks to the cache dump 503. In one block, the data chunk 502A is of a medium size, the data chunk 502B is of a small size, and the data chunk 502C is of a large size. Each of these sizes may be relative and may be specific to a given implementation. A large data block may be much larger in cases where infrastructure provides high-bandwidth data pipes and plentiful and fast data storage devices, whereas a large data block in other situations with less data transfer bandwidth and slower data storage devices may be much smaller. Regardless of the actual size of the data chunks 502A-502C, it should be noted that each data chunk copied from the originating cluster 501 to the cache dump 503 (and between the cache dump and the destination cluster) may vary in size based on the type of data transferred, based on the available bandwidth, based on the available storage in the cache dump or the destination cluster, or based on other factors. The cache warmer controller 110 is designed to select an optimal data chunk size for each transferred data chunk based on the conditions that exist as that data chunk is about to be transferred.

Figure 6:
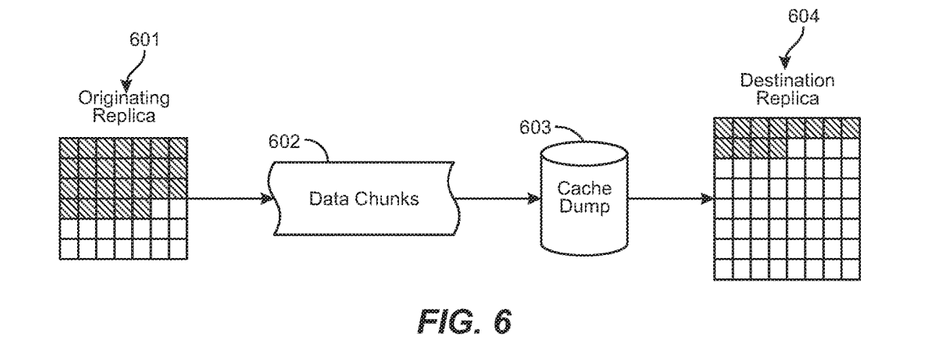
FIG. 6 illustrates an embodiment in which data chunks from an originating replica are transferred asynchronously to a destination cluster.

FIG. 6 illustrates an embodiment in which data chunks 602 are copied to the cache dump 603 as each data chunk becomes available. These data chunks may be variably sized, as shown in FIG. 5. The data chunks 602 are initially stored in the originating replica 601. The originating replica 601 may include any number of replica nodes and the data (indicated by hashed lines) may be distributed over any of these replica nodes. The data is divided into data chunks 602 and sent to the cache dump 603. In some cases, the data chunks are transferred to the cache dump 603 and on to the destination replica 604 as the data chunks become available. Thus, the cache dump does not need to be complete before cache data is transferred to the destination replica 604. This process may be referred to as "warming." The destination replica 604 is warmed up gradually, receiving the data chunks 602 from the originating replica 601 in piecemeal fashion. This process avoids overloading the underlying transport network and may be performed at more opportune times such as when network traffic is low or when client requests are low. However, even if client requests are high, the data chunks 602 may still be transferred as they become available.

The configurable-size data chunks 602 are also copied from the cache dump 603 to the destination cluster 604 as each data chunk becomes available at the cache dump. Thus, each side of FIG. 6 (from the originating replica 601 to the cache dump 603, and from the cache dump to the destination replica 604) may separately transfer data chunks 602 when those data chunks become available. Each of these data transfers may occur asynchronously and without regard to the other side. This piecewise copying of the configurable-size data chunks from the cache dump 603 to the destination cluster 604 allows the destination cluster to be populated with cache data without waiting for the entire originating 601 replica to be copied to the cache dump.

In some cases, each cache replica node includes multiple key-chunks. These key-chunks allow the cache data to be copied to the cache dump in parallel. The key-chunks identify portions of cache data that may be separately transferred to the cache dump and to the destination replica. Multiple key-chunks are processed in parallel, and each key-chunk can generate one or more data chunks. These key-chunks (along with other data chunks) may be transferred in parallel from the originating replica 601 to the cache dump 603 and from the cache dump to the destination replica 604. This parallel data transfer allows for much faster cache warming and allows the system to take advantage of periods of low client requests or other opportune conditions for data copying.

Figure 7:
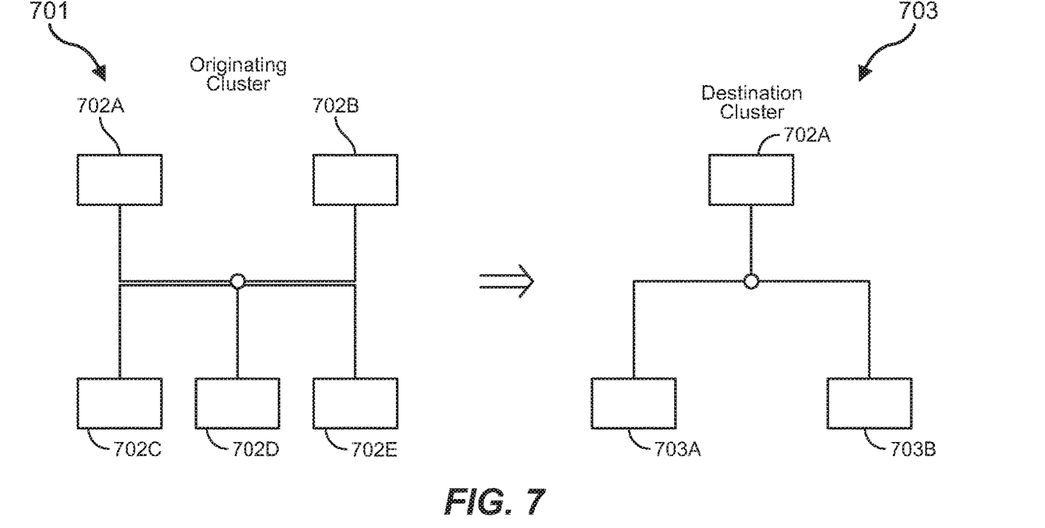
FIG. 7 illustrates an embodiment in which data a node from an originating cluster is part of a destination cluster.

FIG. 7 illustrates an embodiment in which a destination cluster includes at least one replica node from an originating cluster. For example, the originating cluster 701 includes replica nodes 702A-702E. The cache data stored on the originating cluster may be transferred to destination cluster 703. The destination cluster 703 includes node 702A from the originating cluster 701, as well as two new nodes: 703A and 703B. It will be recognized that the destination cluster 703 may include any or all of the nodes of the originating cluster 701. Thus, in some embodiments, the destination cluster 703 includes nodes 702A, 702B, and 702C, while in other embodiments, destination cluster 703 includes nodes 702C, 702D, and 703A. Other combinations are also possible. Thus, the originating cluster may effectively grow by a single node or shrink by a single node or grow or shrink by an arbitrary number of nodes. When the originating cluster is scaled to a new destination cluster, the originating cluster may be scaled at substantially any ratio and may include any of the replica nodes from the originating cluster.

In some cases, cache data (e.g., 112 of FIG. 1) includes snapshot data. The snapshot data represents a snapshot of a given cluster. The snapshot allows the cluster to be returned to a given state at a given time. For example, the snapshot's name may include a timestamp indicating when the snapshot was taken. The corresponding cluster may be reverted to that date and time using the snapshot. Accordingly, in FIG. 1, cache data 112 copied from the cache dump 113 to the replica nodes of the destination cluster 114 may be a snapshot of a originating cluster 111. The cache data associated with the snapshot may be transferred from the cache dump 113 to the replica nodes of the destination cluster 114 asynchronously with respect to the copying of the cache data 112 from the originating cluster 111 to the cache dump. In some cases, the cache data 112 is preloaded from the originating cluster 111 to the cache dump and then pulled down to the destination cluster 114 at a later time as network conditions permit. In some cases, the asynchronous cache data copies from one location to another are scheduled for a time when the various cluster replica nodes are below a specified threshold level of use.

Throughout the data copying process, the replica nodes of the various clusters are in communication with the computer system 101 or are directly controlled by the computer system 101. In some cases, the originating and destination clusters 111/114 are configured to send messages or otherwise communicate when cache data is being copied from the originating cluster to the cache dump or from the cache dump to the destination cluster. These messages may trigger certain actions on the computer system 101. For example, a message from the originating cluster (e.g., indication 117) indicates that data is being copied to the cache dump 113. This message then triggers the cache warmer controller 110 to begin copying the cache data 112 from the cache dump 113 to the replica nodes of the destination cluster 114.

The cache warmer controller 110 copies cache data from the cache dump to the replica nodes of the destination cluster immediately or at some later time. In some cases, the cache warmer controller 110 copies cache data from the cache dump 113 to the replica nodes of the destination cluster based on current detected usage. For example, the cache warmer controller 110 may have access to network bandwidth information or cluster usage data or other metrics that indicate how heavily the computing resources associated with the originating and destination clusters are being used. Then, based on this usage data, the cache warmer controller schedules asynchronous data transfer of the cache data based on optimal data transfer times and low cluster usage times. If the data is high priority data, the data is copied sooner without waiting for optimal conditions.

Still further, the cache warmer controller may transfer the data in different sized data chunks and may transfer the chunks in parallel according to the key-chunks. In some cases, the cache warmer controller 110 transfers data between the originating cluster and the cache warmer or between the cache warmer and the destination cluster based on predicted usage. For instance, if the destination cluster 114 is predicted to be under heavy use for the next six hours, the cache data transfer to the destination cluster is postponed by six hours according to the prediction. In this manner, the cache warmer controller 110 has full control over how and when the cache data is transferred between nodes.

Figure 8:
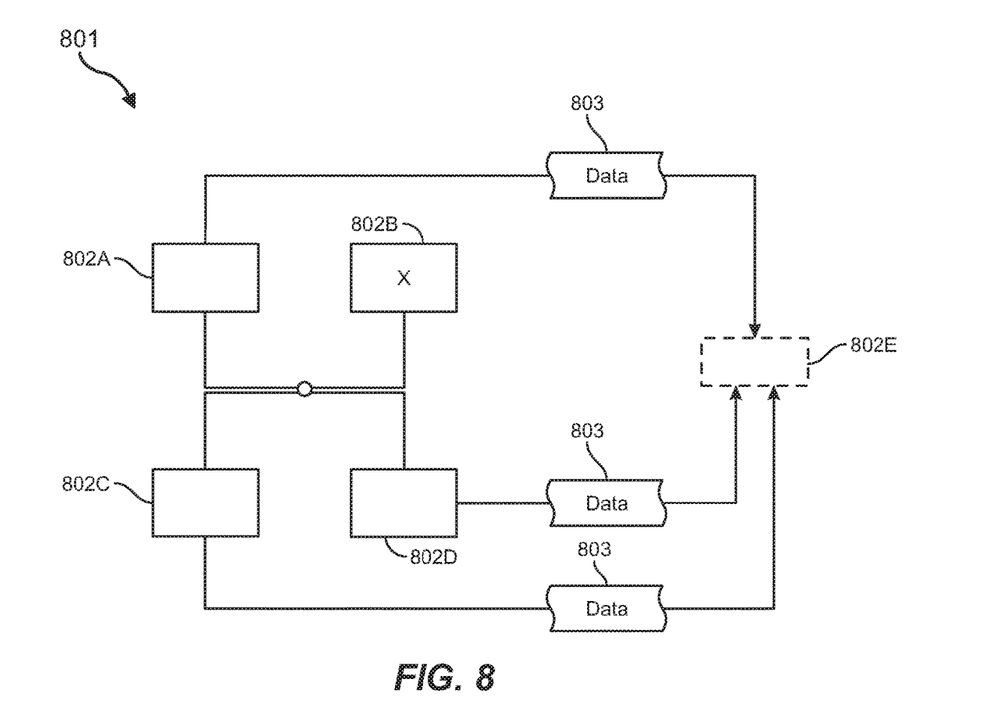
FIG. 8 illustrates an embodiment in which a new replica node instances is warmed with cache data from one or more nodes of a different replica.

FIG. 8 illustrates an embodiment in which the cache warmer controller 110 copies data to a new instance of the same cluster. For example, in some circumstances, the cache data 803 is not copied to different cluster, but to a new instance in the same cluster. In cluster 801, for example, node 802B has gone offline due to a hardware or software failure. The data stored in the cluster nodes 802A-802D is duplicated so that a loss of any single node is not fatal and does not result in data loss. As such, in this embodiment, the cache warmer controller 110 of FIG. 1 pulls data 803 from each of the other, still functioning nodes 802A, 802C, and 802D (or from nodes in another cluster). This data is transferred to new cluster node 802E. The data may be transferred in the same manner as that described above: in different size data chunks, in parallel using key-chunks, asynchronously from the other nodes of the cluster, and according to current cluster use or predicted future use. Accordingly, cache data may be transferred new nodes within the same cluster in a similar manner.

A corresponding system includes at least one physical processor and physical memory comprising computer-executable instructions that, when executed by the physical processor, cause the physical processor to: receive an indication that one or more portions of cache data are to be copied from an originating cluster having a specified number of replica nodes to a destination cluster having an arbitrary number of replica nodes, copy the one or more portions of cache data to a cache dump, create a log that identifies where the one or more portions of cache data are stored in the cache dump, and copy the one or more portions of cache data from the cache dump to the replica nodes of the destination cluster, wherein the copying includes writing the copied data in a distributed manner, such that at least a portion of the copied data is distributed over each of the replica nodes in the destination cluster.

A non-transitory computer-readable medium includes one or more computer-executable instructions that, when executed by at least one processor of a computing device, cause the computing device to: receive an indication that one or more portions of cache data are to be copied from an originating cluster having a specified number of replica nodes to a destination cluster having an arbitrary number of replica nodes, copy the one or more portions of cache data to a cache dump, create a log that identifies where the one or more portions of cache data are stored in the cache dump, and copy the one or more portions of cache data from the cache dump to the replica nodes of the destination cluster, wherein the copying includes writing the copied data in a distributed manner, such that at least a portion of the copied data is distributed over each of the replica nodes in the destination cluster.

In this manner, method and systems are provided which allow data to be transferred to new clusters in a highly efficient manner without the costly overhead of previous solutions. The embodiments described herein allow clusters to be scaled at any ratio, up or down, from any size to any size. Throughout the process, the data remains fully backed up and available to fulfill user requests. The cache copying may be scheduled and performed at low usage times, or if needed for high-priority data, may be performed at peak usage times. This flexibility is not found in traditional data distribution systems.

Example Embodiments

1. A computer-implemented method comprising: receiving an indication that one or more portions of cache data are to be copied from an originating cluster having a specified number of replica nodes to a destination cluster having an arbitrary number of replica nodes; copying the one or more portions of cache data to a cache dump; creating a log that identifies where the one or more portions of cache data are stored in the cache dump; and copying the one or more portions of cache data from the cache dump to the replica nodes of the destination cluster, wherein the copying includes writing the copied data in a distributed manner, such that at least a portion of the copied data is distributed over each of the replica nodes in the destination cluster.

2. The computer-implemented method of claim 1, wherein the one or more portions of cache data are copied from the cache dump to the replica nodes of the destination cluster while the destination cluster is fulfilling client requests.

3. The computer-implemented method of claim 1, wherein replica nodes are dynamically added to or removed from the destination cluster.

4. The computer-implemented method of claim 3, wherein a cache warmer controller tracks the added or removed nodes in the destination cluster.

5. The computer-implemented method of claim 4, wherein the cache warmer controller indicates where to copy the cache data when the nodes are added or removed from the destination cluster.

6. The computer-implemented method of claim 1, wherein the one or more portions of cache data are copied to the cache dump in configurable size data chunks.

7. The computer-implemented method of claim 6, wherein the configurable-size data chunks are copied to the cache dump as each data chunk becomes available.

8. The computer-implemented method of claim 7, wherein the configurable-size data chunks are copied from the cache dump to the destination cluster as each data chunk becomes available.

9. The computer-implemented method of claim 8, wherein piecewise copying of the configurable-size data chunks from the cache dump to the destination cluster allows the destination cluster to be populated without waiting for an entire replica to be copied to the cache dump.

10. The computer-implemented method of claim 1, wherein each cache replica node includes multiple key-chunks, allowing the cache data to be copied to the cache dump in parallel.

11. The computer-implemented method of claim 1, wherein the destination cluster includes at least one replica node from the originating cluster.

12. A system comprising: at least one physical processor; and physical memory comprising computer-executable instructions that, when executed by the physical processor, cause the physical processor to: receive an indication that one or more portions of cache data are to be copied from an originating cluster having a specified number of replica nodes to a destination cluster having an arbitrary number of replica nodes; copy the one or more portions of cache data to a cache dump; create a log that identifies where the one or more portions of cache data are stored in the cache dump; and copy the one or more portions of cache data from the cache dump to the replica nodes of the destination cluster, wherein the copying includes writing the copied data in a distributed manner, such that at least a portion of the copied data is distributed over each of the replica nodes in the destination cluster.

13. The system of claim 12, wherein the originating cluster is scalable to a new destination cluster at a plurality of different ratios of replica nodes from the originating cluster to the new destination cluster.

14. The system of claim 12, wherein copying the one or more portions of cache data from the cache dump to the replica nodes of the destination cluster occurs asynchronously from the copying of the cache data to the cache dump.

15. The system of claim 14, wherein one or more of the asynchronous cache data copies are scheduled for a time when the destination cluster replica nodes are below a specified threshold level of use.

16. The system of claim 12, wherein at least one replica node of the originating cluster sends a message when at least a portion of the cache data has been copied to the cache dump.

17. The system of claim 16, wherein the message triggers a cache warmer controller to begin copying the one or more portions of cache data from the cache dump to the replica nodes of the destination cluster.

18. The system of claim 12, wherein the one or more portions of cache data are copied from the cache dump to the replica nodes of the destination cluster based on at least one of current detected usage or predicted usage of the destination cluster.

19. The system of claim 12, wherein the one or more portions of cache data copied from the cache dump to the replica nodes of the destination cluster comprise snapshot data representing a snapshot of cache data.

20. A non-transitory computer-readable medium comprising one or more computer-executable instructions that, when executed by at least one processor of a computing device, cause the computing device to: receive an indication that one or more portions of cache data are to be copied from an originating cluster having a specified number of replica nodes to a destination cluster having an arbitrary number of replica nodes; copy the one or more portions of cache data to a cache dump; create a log that identifies where the one or more portions of cache data are stored in the cache dump; and copy the one or more portions of cache data from the cache dump to the replica nodes of the destination cluster, wherein the copying includes writing the copied data in a distributed manner, such that at least a portion of the copied data is distributed over each of the replica nodes in the destination cluster.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to copy data to a cache dump, use the result of the transformation to warm a new data cluster, and store the result of the transformation to service requests from the new data cluster. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving an indication that one or more portions of cache data are to be copied from an originating cluster having a specified number of replica nodes to a destination cluster having an arbitrary number of replica nodes;
copying the one or more portions of cache data to a cache dump;
creating a log that identifies where the one or more portions of cache data are stored in the cache dump; and
copying the one or more portions of cache data from the cache dump to the replica nodes of the destination cluster, wherein the copying includes writing the copied data in a distributed manner, such that at least a portion of the copied data is distributed over each of the replica nodes in the destination cluster.

2. The computer-implemented method of claim 1, wherein the one or more portions of cache data are copied from the cache dump to the replica nodes of the destination cluster while the originating cluster and destination clusters are fulfilling client requests.

3. The computer-implemented method of claim 1, wherein replica nodes are dynamically added to or removed from the destination cluster.

4. The computer-implemented method of claim 3, wherein a cache warmer controller tracks the added or removed nodes in the destination cluster.

5. The computer-implemented method of claim 4, wherein the cache warmer controller indicates where to copy the cache data when the nodes are added or removed from the destination cluster.

6. The computer-implemented method of claim 1, wherein the one or more portions of cache data are copied to the cache dump in configurable size data chunks.

7. The computer-implemented method of claim 6, wherein the configurable-size data chunks are copied to the cache dump as each data chunk becomes available.

8. The computer-implemented method of claim 7, wherein the configurable-size data chunks are copied from the cache dump to the destination cluster as each data chunk becomes available.

9. The computer-implemented method of claim 8, wherein piecewise copying of the configurable-size data chunks from the cache dump to the destination cluster allows the destination cluster to be populated without waiting for an entire replica to be copied to the cache dump.

10. The computer-implemented method of claim 1, wherein each cache replica node includes multiple keychunks, allowing the cache data to be copied to the cache dump in parallel.

11. The computer-implemented method of claim 1, wherein the destination cluster includes at least one replica node from the originating cluster.

12. A system comprising:
at least one physical processor; and
physical memory comprising computer-executable instructions that, when executed by the physical processor, cause the physical processor to:
receive an indication that one or more portions of cache data are to be copied from an originating cluster having a specified number of replica nodes to a destination cluster having an arbitrary number of replica nodes;
copy the one or more portions of cache data to a cache dump;
create a log that identifies where the one or more portions of cache data are stored in the cache dump; and
copy the one or more portions of cache data from the cache dump to the replica nodes of the destination cluster, wherein the copying includes writing the copied data in a distributed manner, such that at least a portion of the copied data is distributed over each of the replica nodes in the destination cluster.

13. The system of claim 12, wherein the originating cluster is scalable to a new destination cluster at a plurality of different ratios of replica nodes from the originating cluster to the new destination cluster.

14. The system of claim 12, wherein copying the one or more portions of cache data from the cache dump to the replica nodes of the destination cluster occurs asynchronously from the copying of the cache data to the cache dump.

15. The system of claim 14, wherein one or more of the asynchronous cache data copies are scheduled for a time when the destination cluster replica nodes are below a specified threshold level of use.

16. The system of claim 12, wherein at least one replica node of the originating cluster sends a message when at least a portion of the cache data has been copied to the cache dump.

17. The system of claim 16, wherein the message triggers a cache warmer controller to begin copying the one or more portions of cache data from the cache dump to the replica nodes of the destination cluster.

18. The system of claim 12, wherein the one or more portions of cache data are copied from the cache dump to the replica nodes of the destination cluster based on at least one of current detected usage or predicted usage of the destination cluster.

19. The system of claim 12, wherein the one or more portions of cache data copied from the cache dump to the replica nodes of the destination cluster comprise snapshot data representing a snapshot of cache data.

20. A non-transitory computer-readable medium comprising one or more computer-executable instructions that, when executed by at least one processor of a computing device, cause the computing device to:
receive an indication that one or more portions of cache data are to be copied from an originating cluster having a specified number of replica nodes to a destination cluster having an arbitrary number of replica nodes;

copy the one or more portions of cache data to a cache dump;

create a log that identifies where the one or more portions of cache data are stored in the cache dump; and copy the one or more portions of cache data from the cache dump to the replica nodes of the destination cluster, wherein the copying includes writing the copied data in a distributed manner, such that at least a portion of the copied data is distributed over each of the replica nodes in the destination cluster.

* * * * *